United States Patent [19]

Hitomi

[11] Patent Number: 5,333,811
[45] Date of Patent: Aug. 2, 1994

[54] SPINNING REEL HAVING ANTI-REVERSE MECHANISM THAT FACILITATES BAIL SWITCHING

[75] Inventor: Yasuhiro Hitomi, Hashimoto, Japan

[73] Assignee: Shimano Inc., Osaka, Japan

[21] Appl. No.: 932,694

[22] Filed: Aug. 20, 1992

[30] Foreign Application Priority Data

Aug. 26, 1991 [JP] Japan ............................. 3-067147[U]

[51] Int. Cl.5 ........................................... A01K 89/027
[52] U.S. Cl. ..................................... 242/232; 242/247
[58] Field of Search ............... 242/232, 233, 247, 248, 242/306

[56] References Cited

U.S. PATENT DOCUMENTS

| | | | |
|---|---|---|---|
| 2,229,470 | 1/1941 | Pezon | 242/247 X |
| 2,705,113 | 3/1955 | Bonanno | 242/232 |
| 2,901,193 | 8/1959 | Askins et al. | 242/306 X |
| 4,238,085 | 12/1980 | Jansson et al. | 242/232 X |
| 4,279,387 | 7/1981 | Morimoto | 242/232 |
| 4,389,027 | 6/1983 | Sazaki et al. | 242/233 |
| 4,426,045 | 1/1984 | Gifford | 242/232 |

Primary Examiner—Daniel P. Stodola
Assistant Examiner—Michael R. Mansen
Attorney, Agent, or Firm—Dickstein, Shapiro & Morin

[57] ABSTRACT

A spinning reel has a rotor; a bail pivotally connected to the rotor through a pair of oscillatable arms to be switchable between a line takeup position and a line release position; an anti-reverse mechanism including an engaging member and an engageable member, and operable by a lever mounted on a reel body to be switchable between a position to allow free rotation of the rotor, and a position to prevent backward rotation thereof and allow rotation only in a line winding direction; and a switching mechanism including a control member mounted on one end of the rotor for switching the bail, and a cam formed integral with the reel body for contacting the control member, the switching mechanism being operable, through interaction between the control member and the cam occurring with rotation in the line winding direction of the rotor, to switch the bail from the line takeup position to the line release position. The anti-reverse mechanism has a range of play for allowing the rotor to rotate in a line unwinding direction while the control member moves into contact with the cam. This enables the bail to be switched to the line release position smoothly even when the rotor is prevented from rotating backward.

4 Claims, 5 Drawing Sheets

SPINNING REEL HAVING ANTI-REVERSE MECHANISM THAT FACILITATES BAIL SWITCHING

BACKGROUND OF THE INVENTION

1. Field of the Invention

The present invention relates to a spinning reel having a bail extending between a pair of arms formed on a rotor to be retainable in either a takeup position or a release position by a biasing force of a toggle mechanism, a switching mechanism for switching the bail to the takeup position by means of a control member operable through contact with a cam formed on a reel body when the rotor is rotated in a line winding direction with the bail set to the release position, and an anti-reverse mechanism for preventing the rotor from rotating in a line unwinding direction.

2. Description of the Related Art

A known switching mechanism as noted above is disclosed in Japanese Utility Model Publication Kokai No. 62-80570, for example. In this prior construction, a toggle mechanism imparts a biasing force to an arm cam supporting one end of a bail. An arm houses a pivotable control member for contacting an end of the toggle mechanism. A reel body includes a cam for switching the bail to a takeup position by transmitting torque of a rotor in rotation to the toggle mechanism. According to this prior construction, the angler may switch the bail from the release position to the takeup position only by turning a handle to take up a fishing line without directly operating the bail. Thus, the prior construction provides the advantage of facilitating a reeling operation.

A known anti-reverse mechanism, such as one included in the above prior construction, usually includes a ratchet wheel mounted on a shaft for transmitting torque of the rotor, and a pawl for engaging the ratchet wheel. According to this construction, when an attempt is made to switch the bail to the release position, with the pawl engaging the ratchet wheel, and with the rotor lying in a phase for allowing contact between the control member and cam, the bail cannot be switched to the release position since the control member and cam contact each other while the rotor is held against rotation. This situation may even damage the switching mechanism, anti-reverse mechanism and the like. Thus, there is room for improvement.

Such an inconvenience will occur for the following reason. As shown in the prior art, the cam formed on the reel body defines cam surfaces inclined from a position of maximum projection thereof. When an attempt is made to switch the bail to the release position as noted above, the control member may contact a cam surface that imparts a reversing force to the rotor. In this case, a strong force acts on a control line extending from the bail to the cam while rotation of the rotor is prevented by the anti-reverse mechanism. At the same time, the pawl and adjacent regions of the anti-reverse mechanism are subjected to a strong force. These regions may be damaged as a result.

SUMMARY OF THE INVENTION

An object of the present invention is to provide an improved spinning reel having an anti-reverse mechanism and a switching mechanism, which facilitates switching of a bail to a release position regardless of a rotational phase of a rotor.

The above object is fulfilled, according to the present invention, by a spinning reel comprising a rotor; a bail pivotally connected to the rotor through a pair of oscillatable arms to be switchable between a line takeup position and a line release position; an anti-reverse mechanism including an engaging member and an engageable member, and operable by a lever mounted on a reel body to be switchable between a position to allow free rotation of the rotor, and a position to prevent backward rotation thereof and allow rotation only in a line winding direction; and a switching mechanism including a control member mounted on one end of the rotor for switching the bail, and a cam formed integral with the reel body for contacting the control member, the switching mechanism being operable, through interaction between the control member and the cam occurring with rotation in the line winding direction of the rotor, to switch the bail from the line takeup position to the line release position; wherein the anti-reverse mechanism has a range of play for allowing the rotor to rotate in a line unwinding direction while the control member moves into contact with the cam.

Thus, an improved spinning reel having the above construction is provided by the present invention, which facilitates switching of the bail to the release position regardless of a rotational phase of the rotor.

In a preferred embodiment of the invention, the anti-reverse mechanism includes teeth formed on an inner surface of the rotor. These teeth may be arranged at smaller intervals than in a construction having a ratchet wheel or the like mounted in a shaft system for driving the rotor. This results in a reduced play in preventing the rotor from rotating backward, which provides an advantage of reducing shocks occurring during a fish hooking and landing operation.

Other objects and features of this invention will be understood from the following description taken with reference to the accompanying drawings.

DETAILED DESCRIPTION OF THE PREFERRED EMBODIMENTS

An embodiment of the present invention will be described hereinafter with reference to the drawings.

Figure 1:
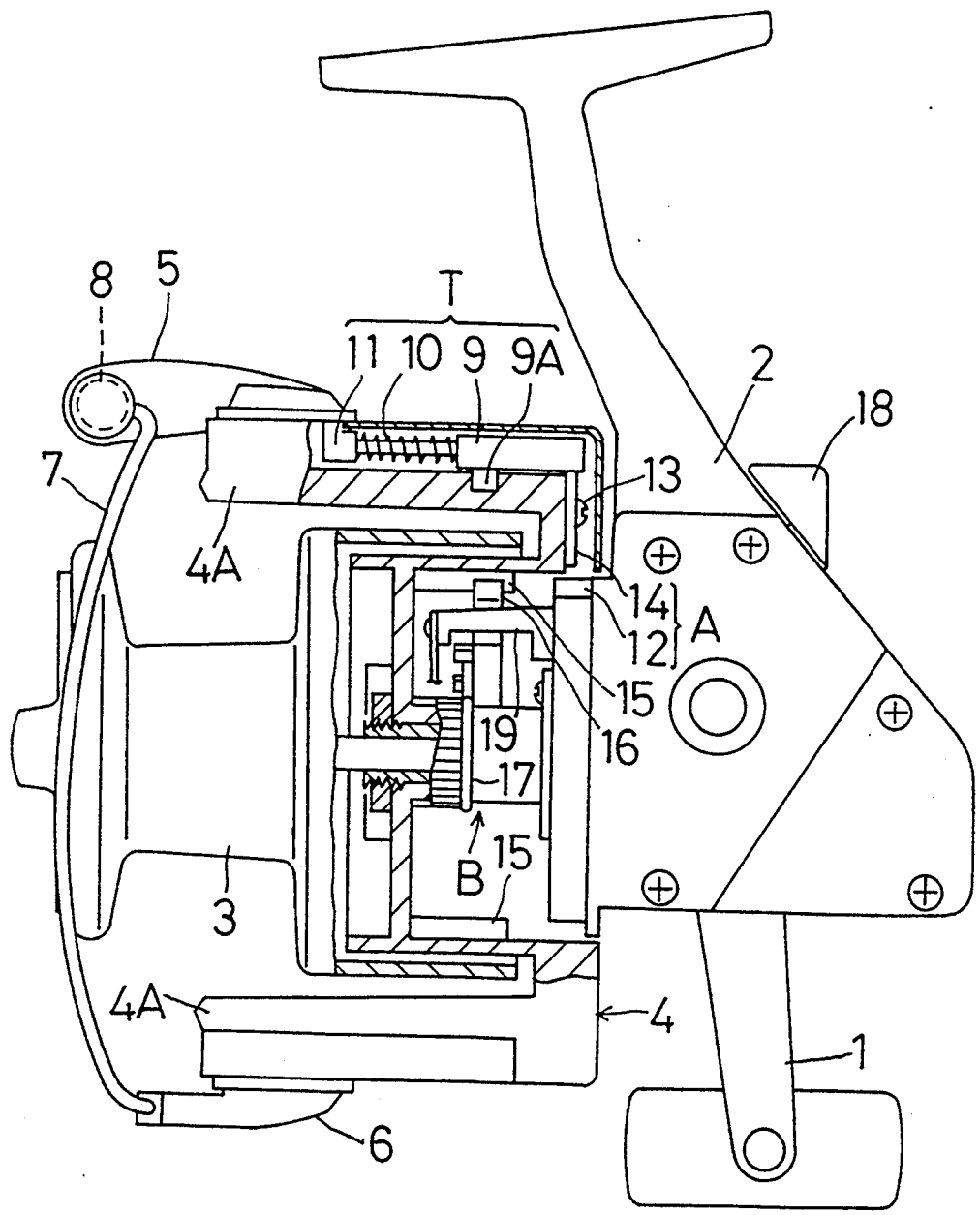
FIG. 1 is a side view partly in section of a spinning reel according to the present invention.

As shown in FIG. 1, a spinning reel has a handle 1 connected to a reel body 2 including, in forward positions thereof, a spool 3 for winding a fishing line, and a rotor 4 rotatable by drive transmitted from the handle 1. The rotor 4 includes a pair of arms 4A having an arm cam 5 and an oscillatable arm 6. A bail 7 extends between the arm cam 5 and oscillatable arm 6.

Figure 2:
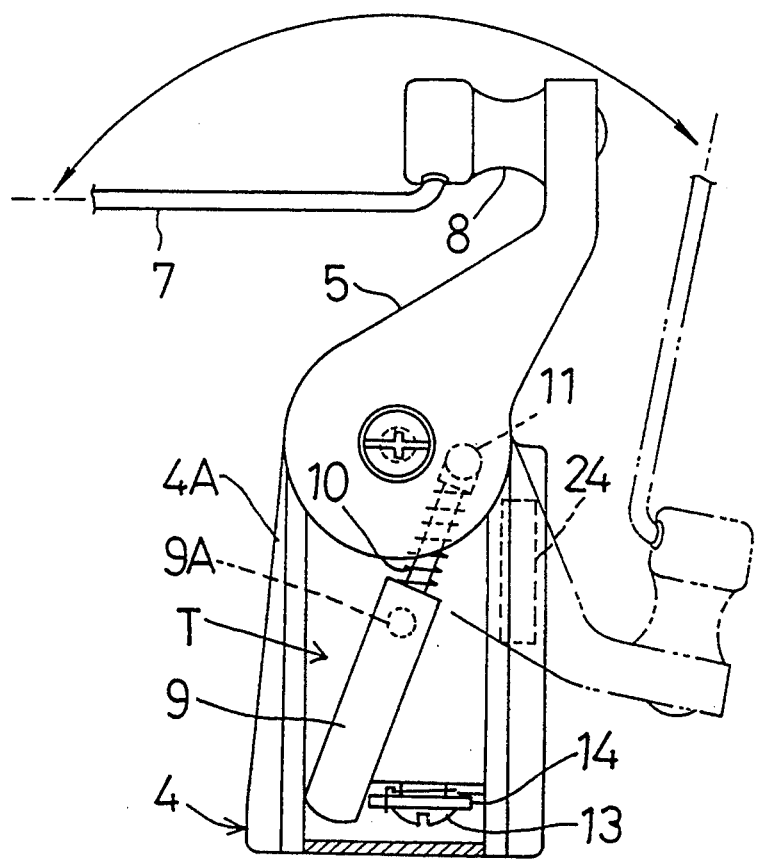
FIG. 2 is a side view of a bail switching toggle mechanism.

As shown in FIG. 2, the arm cam 5 has a line roller 8, and the arm 4A supporting the arm cam 5 houses a toggle mechanism T for maintaining the bail 7 in a takeup position or a release position. The toggle mechanism T includes a spring bearing 9 oscillatable on an axis 9A, a spring 10, and a rod 11 biased by the spring 10 to project relative to the bearing 9. A switching mechanism A is provided between the arm 4A and reel body 2 for switching the bail 7 to the takeup position.

Figure 4:
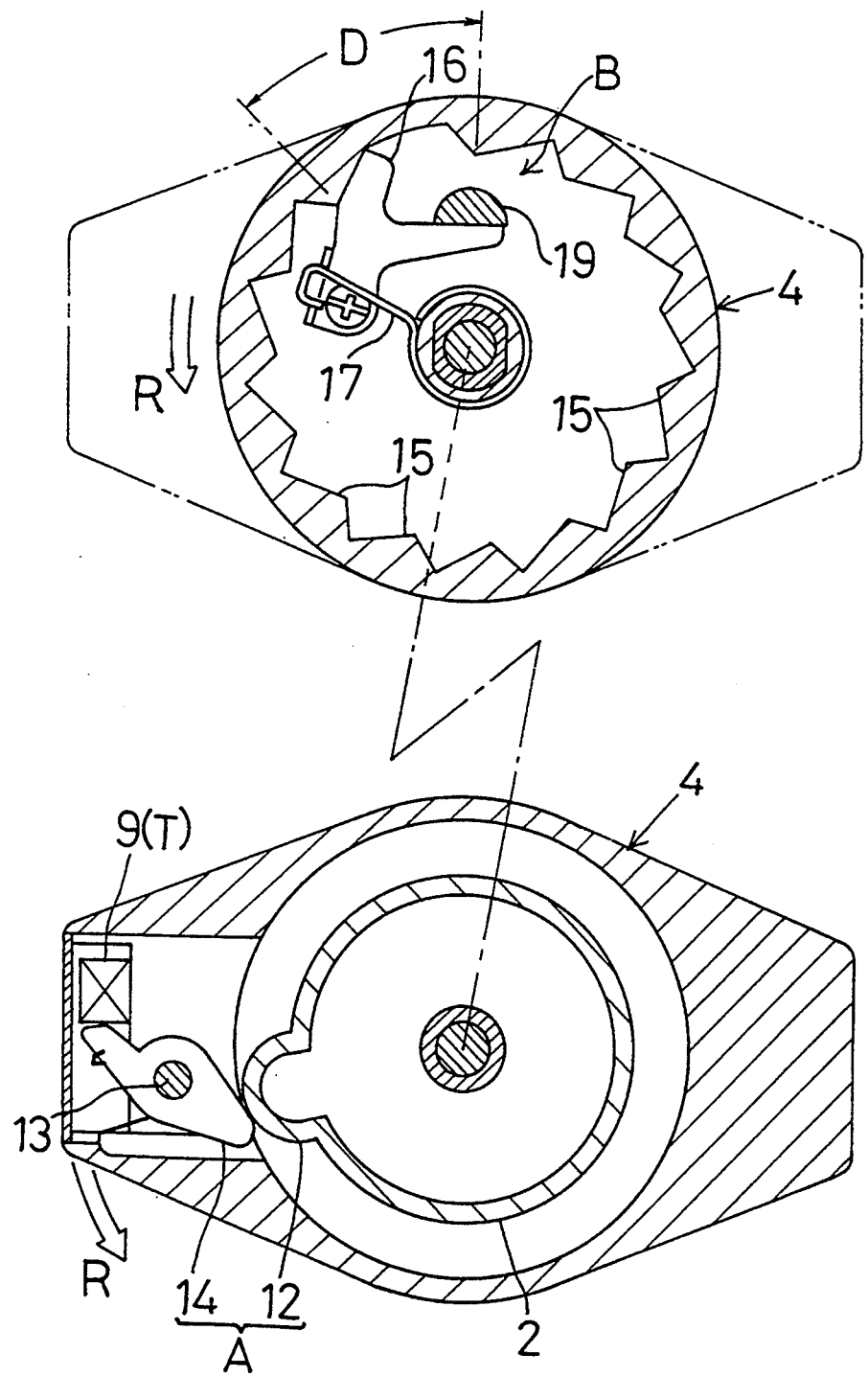
FIG. 4 is a sectional view of the anti-reverse mechanism in a position to prevent backward rotation.

As shown in FIG. 4, the switching mechanism A includes a cam 12 formed on the reel body 2, and a control member 14 pivotable about a support axis 13 to contact the cam 12 and cause bail 7 through the toggle mechanism T and arm cam 5 to switch to the takeup position.

Figure 3:
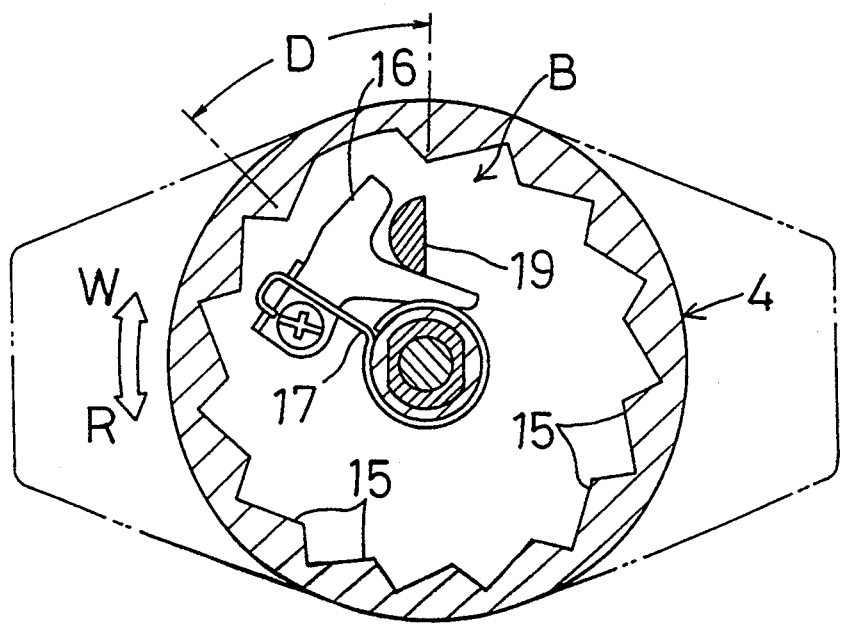
FIG. 3 is a sectional view of an anti-reverse mechanism in a position to allow free rotation.

As shown in FIGS. 3 and 4, the reel further includes an anti-reverse mechanism B for preventing the rotor 4 from rotating in a line unwinding direction R. This mechanism B is a silent type mechanism including a plurality of teeth 15 formed on an inner peripheral surface of the rotor 4, a pawl 16 for engaging the teeth 15, and a control element 17 for moving the pawl 16 toward the teeth 15 when the rotor 4 rotates in the line unwinding direction R. The anti-reverse mechanism B is switchable by a shaft 19 operable by a lever 18 mounted on the reel body 2, between a position to prevent backward rotation of rotor 4 (FIG. 4) and a position to allow free rotation thereof (FIG. 3).

According to this anti-reverse mechanism B, an adjacent pair of teeth 15, which are opposed to the pawl 16 when the rotor 4 is in a phase to allow contact between the control member 14 and cam 12, have a larger distance therebetween than other pairs of teeth 15. Thus, when the bail 7 is switched to the release position, with the rotor 4 lying in that phase, the rotor 4 is allowed to rotate in the line unwinding direction R, thereby to protect the switching mechanism A, anti-reverse mechanism B and the like from damage.

That is, the rotor 4 may be in a phase in which the control member 14 contacts a position of maximum projection of the cam 12 at an initial stage of switching to the release position of the bail 7. The rotor 4 is rotatable at this time since the anti-reverse mechanism B is inoperative while the rotor 4 is in a range of phases for allowing contact between the cam 12 and control member 14. The control member 14 is thus allowed to move toward a lower side of the cam 14 (i.e. toward a rotational axis of the rotor 4). Consequently, there is no possibility of a strong force being applied between the teeth 15 and pawl 16 or between the control member 14 and cam 12.

Figure 5:
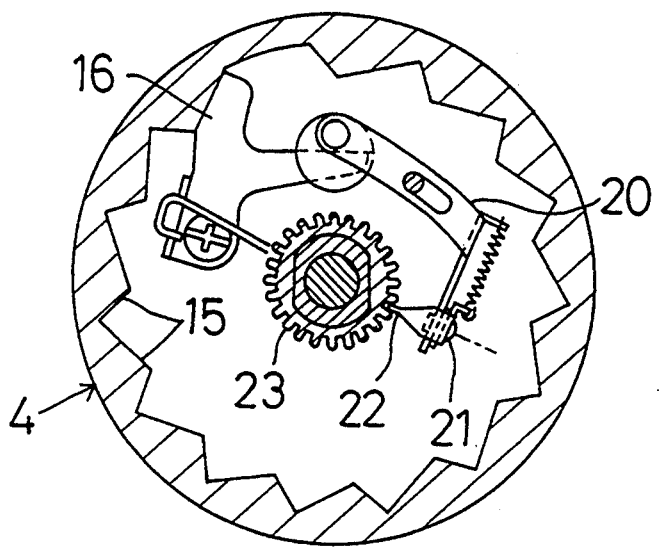
FIG. 5 is a sectional view of a clicking structure with a rotor at rest.
Figure 6:
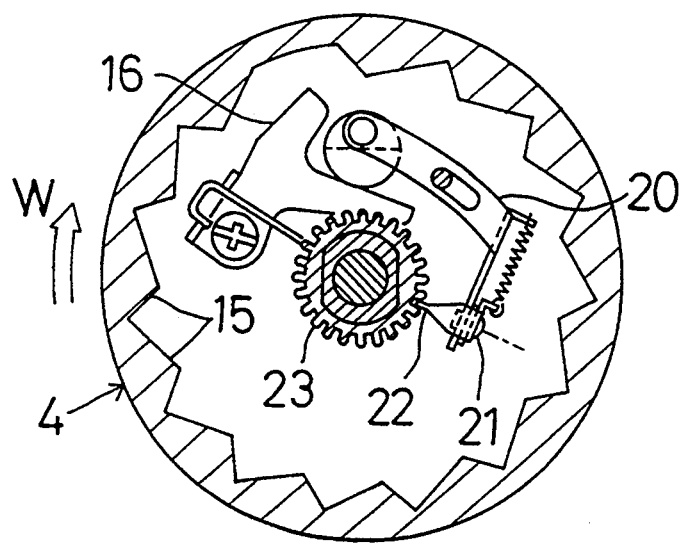
FIG. 6 is a sectional view of the clicking structure with the rotor in rotation.

As shown in FIGS. 5 and 6, the rotor 4 contains a mechanism for producing a clicking sound when the rotor 4 rotates in a line winding direction, with the lever 18 operated to prevent backward rotation thereof. This mechanism includes a sound producing piece 22 attached to a frame 20 interlocked to the shaft 19. The sound producing piece 22 is oscillatable about an axis 21, and switchable between a position to engage a gear-like portion 23 formed inside the rotor 4, and a position retracted therefrom. As noted hereinbefore with reference to FIGS. 3 and 4, the pawl 16 of the anti-reverse mechanism B in this embodiment is a silent type. That is, while the rotor 4 rotates in the line winding direction, the pawl 16 is retracted from the teeth 15 by the biasing force of the control element 17 resulting from the rotation and acting in the same, line winding direction. This control element 17 comprises a spring wound around a support axis formed on the rotor 4. This spring 17, following the rotation in the line winding direction of the rotor 4, imparts the biasing force to the pawl 16. Once the rotor 4 stops rotating, the pawl 16 moves back into engagement with one of the teeth 15 under the biasing force inherent in the spring 17.

Figure 7:
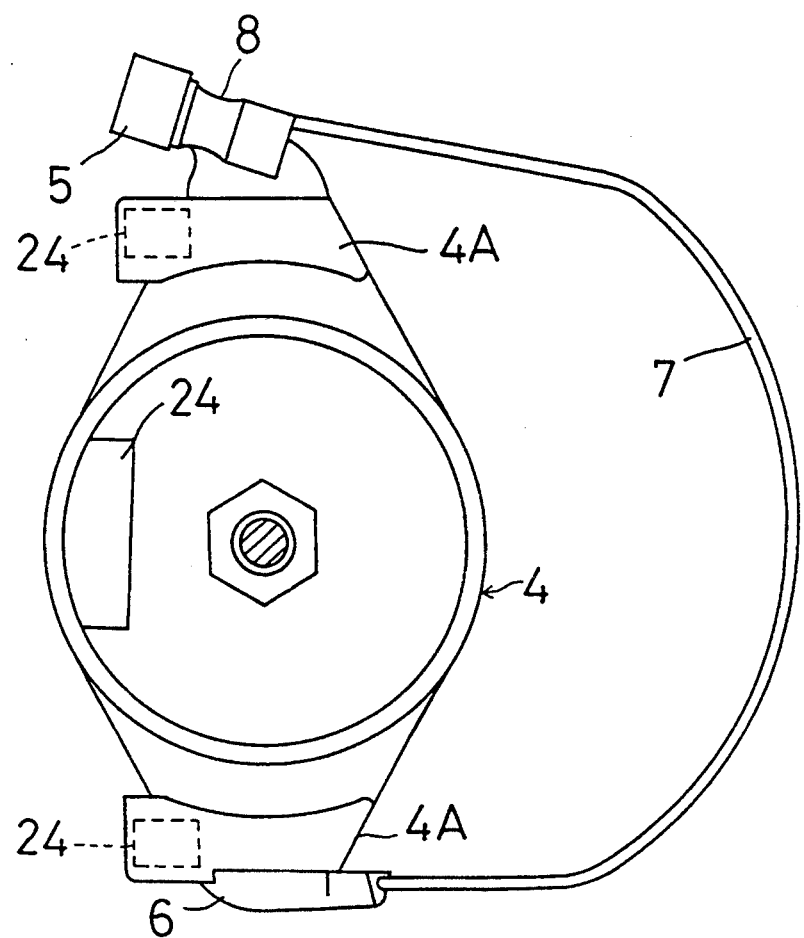
FIG. 7 is a front view of the rotor.

As shown in FIG. 7, the reel includes balancers 24 arranged in positions on the pair of arms 4A and a front surface of the rotor 4 remote from the bail 7, to enable smooth rotation of the rotor 4.

According to the present invention, the foregoing embodiment may be modified such that the control member is slidable, and that the switching mechanism is provided for the oscillatable arm.

What is claimed is:

1. A spinning reel comprising:
   a reel body;
   a rotor rotably supported on said reel body;
   a bail pivotally connected to said rotor through a pair of oscillatable arms to be switchable between a line takeup position and a line release position;
   anti-reverse means operable by a lever mounted on said reel body to be switchable between a position to allow free rotation of said rotor, and a position to prevent backward rotation thereof and allow rotation only in a line winding direction, said anti-reverse means including:
      a plurality of engaging teeth provided on an inner surface of said rotor, and
      a pawl member supported on said reel body, said pawl member being pivotable between an operative position engaged into one of said engaging teeth and an inoperative position disengaged therefrom;
   switching means mounted on one end of said rotor, said switching means including a control member for switching said bail between said line takeup position and said line release position, and a cam formed integral with said reel body for contacting said control member, said switching means being operable, through interaction between said control member and said cam occurring with rotation in said line winding direction of said rotor, to switch said bail from said line release position to said line takeup position; and
   means for allowing said rotor to rotate in a line unwinding direction, said allowing means being provided between said engaging teeth at a region where said control member contacts with said cam.

2. A spinning reel as claimed in claim 1, wherein said allowing means comprises a flat portion on a first region of said inner surface of said rotor that prevents engagement with said pawl member at said operative position thereof.

3. A spinning reel as claimed in claim 2, wherein said engaging teeth are formed with a same pitch on a second region of said inner surface of said rotor.

4. A spinning reel comprising:
   a reel body;
   a rotor;
   a bail pivotally connected to said rotor through a pair of oscillatable arms to be switchable between a line takeup position and a line release position;
   a toggle mechanism including:
      a rod pivotable at a first end about an axis formed on one of said oscillatable arms, a spring bearing pivoted at another end of said rod, and a coiled spring mounted on said rod and having one end thereof abutting on said spring bearing, said coil spring biasing said bail to one of said line takeup position and said line release position;

anti-reverse means operable by a lever mounted on said reel body for switching said rotor between a position to allow free rotation of said rotor, and a position to prevent backward rotation thereof and allow rotation only in a line winding direction, said anti-reverse means including:

a plurality of engaging teeth formed on an inner surface of said rotor, an engaging pawl movable between an operative position to engage into said plurality of engaging teeth and an inoperative position retracted therefrom, and a flat portion provided between said engaging teeth at a predetermined region, said flat portion allowing said rotor to rotate in a line unwinding direction; and switching means including:

a control member mounted on one end of said rotor, and a cam formed integral with said reel body for contacting said control member at a region corresponding to said predetermined region of said flat portion;

said switching means being operable, through interaction between said control member and said cam occurring with rotation in said line winding direction of said rotor to switch said bail from said line release position to said line takeup position.

* * * * *